(12) United States Patent
Kodama et al.

(10) Patent No.: US 7,143,592 B2
(45) Date of Patent: Dec. 5, 2006

(54) ABSORPTION CHILLER-HEATER

(75) Inventors: Mitsuru Kodama, Shizuoka (JP); Takahide Sugiyama, Shizuoka (JP); Kazuhide Ishida, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 162 days.

(21) Appl. No.: 10/772,465

(22) Filed: Feb. 6, 2004

(65) Prior Publication Data

US 2005/0188707 A1    Sep. 1, 2005

(30) Foreign Application Priority Data

Feb. 7, 2003    (JP)    ............................. P2003-031240

(51) Int. Cl.
*F25B 15/00*    (2006.01)

(52) U.S. Cl. ............................. 62/148; 62/476; 62/479; 165/58

(58) Field of Classification Search ................ 62/148, 62/143, 141, 476, 479, 480, 481; 165/58, 165/63, 64
See application file for complete search history.

(56) References Cited

U.S. PATENT DOCUMENTS

| | | | | | |
|---|---|---|---|---|---|
| 4,894,998 | A | * | 1/1990 | Kaneko et al. | ................ 62/148 |
| 5,142,877 | A | * | 9/1992 | Shimizu | ....................... 62/129 |
| 5,289,868 | A | * | 3/1994 | Koseki et al. | ............... 165/219 |

FOREIGN PATENT DOCUMENTS

JP    6-281288 A    10/1994

* cited by examiner

*Primary Examiner*—Melvin Jones
(74) *Attorney, Agent, or Firm*—Sughrue Mion, PLLC (57) ABSTRACT

There is constructed a constitution including an exhaust heat fired regenerator constituting a heat source by exhaust heat from external machine generating the exhaust heat, a heat fluid flow path for making a fluid having the exhaust heat constituting the heat source or a fluid recovering the exhaust heat flow to the exhaust heat fired regenerator, flow path open/close device provided at the heat fluid flow path for controlling to make the heat fluid flow to the exhaust heat fired regenerator 1 and cut off the fluid therefrom by opening and closing the exhaust fluid flow path, first regenerator temperature detector for detecting temperature of the exhaust heat fired regenerator, a directly fired regenerator constituting a heat source by combustion heat of a burner, second regenerator temperature detector for detecting temperature of the directly fired regenerator, heat medium temperature detector for detecting temperature of a heat medium cooled or heated by an evaporator and controller for controlling to operate the flow path open/close device and the burner, in which a combustion amount of the burner can be increased and reduced and the controller controls to open and close the flow path open/close device and increase and reduce the combustion amount of the burner in accordance with the temperature of the heat medium detected by the heat medium temperature detector and a higher one of temperature of the temperature of the exhaust heat fired regenerator detected by the first regenerator temperature detector and the temperature of the directly fired regenerator detected by the second regenerator temperature detector.

4 Claims, 7 Drawing Sheets

ABSORPTION CHILLER-HEATER

The present application is based on Japanese Patent Application No. 2003-80425, the entire contents of which are incorporated herein by reference.

BACKGROUND OF THE INVENTION

1. Field of the Invention

The present invention relates to an absorption chiller-heater, particularly relates to an absorption chiller-heater of a multi heat source drive type having an exhaust heat fired regenerator constituting a heat source by exhaust heat and a directly fired regenerator constituting a heat source by combustion heat of a burner.

2. Related Art

According to an absorption chiller-heater of a multi heat source drive type having an exhaust heat fired regenerator constituting a heat source by exhaust heat and a directly fired regenerator constituting a heat source by combustion heat of a burner, in order to achieve energy conservation performance, normally driving by utilizing exhaust heat is predominantly carried out. For example, in an air conditioning system, when air conditioning is requested, first, the absorption chiller-heater is driven by the exhaust heat fired regenerator by utilizing exhaust heat and when a heat amount of exhaust heat is insufficient relative to an air conditioning load, the absorption chiller-heater is driven by combusting the burner of the directly fired regenerator. At this occasion, in order to control to combust the burner in correspondence with a load of the air conditioning load or the like, the burner is controlled to combust in accordance with temperature of a heat medium cooled or heated by an evaporator of the absorption chiller-heater, that is, temperature of the heat medium in an outlet portion from the evaporator of a heat medium passage in which the heat medium flows.

Here, when the load of the air conditioning load or the like is large, there is a case in which a heat input amount of the absorption chiller-heater becomes excessive since two generators of the exhaust heat fired regenerator and the directly fired regenerator are driven. Further, there is a case in which the heat input amount becomes excessive when a deficiency in the input heat amount at the exhaust heat fired regenerator is supplemented by the directly fired regenerator and the exhaust heat amount which has been reduced is increased or the like. In such a case in which the heat input amount becomes excessive, when the burner is controlled to combust in accordance with temperature of the heat medium at the outlet portion from the evaporator of the heat medium passage, the burner is continued to drive until temperature of the heat medium becomes lower than predetermined temperature even when the input heat amount becomes excessive. Therefore, there is a possibility of posing a problem in reliability of the absorption chiller-heater such that the temperature of the exhaust heat fired regenerator or the directly fired regenerator is excessively elevated, the temperature of the regenerator becomes abnormal, operation of the absorption chiller-heater is stopped or an absorbent solution in the exhaust heat fired regenerator or the directly fired regenerator is excessively condensed to crystallize by which a member constituting the regenerator is liable to corrode and a frequency of maintenance operation is increased or the like.

There is proposed an absorption chiller-heater of a multi heat source drive type having an exhaust heat fired regenerator and a directly fired regenerator, including detecting device for detecting temperature of the directly fired regenerator in order to prevent excessive rise of temperature of the regenerator brought about by simultaneously driving the exhaust heat fired regenerator and the directly fired regenerator in starting, wherein when the temperature detected by the detecting device becomes a previously set temperature, combustion of a burner of the directly fired regenerator is stopped to thereby restrict a heat input amount (for example, refer to JP-A-6-281288 (pages 2–3, FIG. 1)).

However, according to JP-A-6-281288, there is prevented the excessive rise of the temperature of the exhaust heat fired regenerator or the directly fired regenerator brought about by simultaneously driving the exhaust heat fired regenerator and, the directly fired regenerator in starting in ordrer to shorten a time period of starting the absorption chiller-heater. Further, a premise is constituted by the fact that 100% of an exhaust heat amount is necessarily present and therefore, no consideration is given to control of heat input amounts to the respective regenerators when the directly fired regenerator is simultaneously driven in order to supplement a deficiency in the heat input amount to the exhaust heat fired regenerator in normal operation.

Further, in the case in which the burner of the directly fired regenerator is assumedly controlled to combust and stop as in JP-A-6-281288, when a heat amount of exhaust heat or the load of the air conditioning load or the like is varied, the burner of the directly fired regenerator is controlled to combust and stop to combust by outlet temperature of the heat medium from the evaporator and temperature of the directly fired regenerator and therefore, there is a case in which the burner of the directly fired regenerator is repeatedly combusted and stopped to combust. Therefore, there is a case of bringing about a state in which the temperature of the directly fired regenerator or the like is excessively elevated intermittently, operation of the regenerator by abnormal temperature of the regenerator cannot be restrained from being stopped or crystallization of the absorbent solution, corrosion of the regenerator or the like cannot be restrained from being brought about and reliability of the absorption chiller-heater cannot be promoted.

SUMMARY OF THE INVENTION

The invention is directed to promote reliability of an absorption chiller-heater.

An absorption chiller-heater of the invention comprises a first regenerator heated by the exhaust heat, a heat fluid flow path in which a heat fluid having the exhaust heat flows, a flow path open/close device provided on the heat fluid flow path for controlling the heat fluid to flow to and to be cut off from the first regenerator by opening and closing the heat fluid flow path, a second regenerator heated by combustion heat of a burner, at least one of first regenerator temperature detector for detecting a temperature of the first regenerator and second regenerator temperature detector for detecting a temperature of the second regenerator, a heat medium temperature detector for detecting a temperature of a heat medium output from an evaporator and a controller for controlling to operate the flow path open/close device and the burner wherein the burner can increase or reduce a combustion amount, and the controller sets a regenerator temperature by either one temperature of the temperature of the first regenerator detected by the first regenerator temperature detector and the temperature of the second regenerator detected by the second regenerator temperature detector and controls to open and close the flow path open/close device and increase and reduce the combustion amount of the burner in accordance with the temperature of the heat medium detected by the heat medium temperature detector and the regenerator temperature.

By constructing such a constitution, a heat input amount to the first regenerator can be controlled by controlling to open and close the flow path open/close device in accordance with an outlet temperature of the heat medium from the evaporator of the heat medium detected by the heat medium temperature detector and either one temperature of the temperature of the first regenerator detected by the first regenerator temperature detector or the temperature of the second regenerator detected by the second regenerator temperature detector. Further, the combustion amount of the burner can be increased and reduced and the combustion amount of the burner is controlled to increase and reduce in accordance with the temperature of the heat medium and the regenerator temperature. Therefore, the heat input amount of the second regenerator can be increased and reduced by increasing and reducing the combustion amount of the burner and it is difficult to bring about a state in which the temperature of the second regenerator or the like is intermittently and excessively elevated as in a case of controlling the heat input amount of the second regenerator by only combusting and stopping to combust the burner. Therefore, even when the heat amount or the load of exhaust heat is varied, the heat input amounts to the respective regenerators are difficult to be excessive, stoppage of the operation by abnormal temperatures of the respective regenerators, crystallization of the absorbent solution, corrosion of the regenerators can be restrained from being brought about and reliability of the absorption chiller-heater can be promoted.

Further, the controller is constructed by a constitution in which the regenerator temperature is set by the temperature of the second regenerator detected by the second regenerator detected by the second regenerator temperature detector. By constructing such a constitution, when only the first regenerator is driven, the control is carried out in accordance with the temperature of the second regenerator showing a temperature substantially the same as that of the first regenerator and therefore, the heat input amount to the regenerator can further firmly be controlled.

Further, there is constructed a constitution comprising both of the first regenerator temperature detector and the second regenerator temperature detector, wherein the controller sets the regenerator temperature by a higher one of either temperature of the temperature of the first regenerator detected by the first regenerator temperature detector and the temperature of the second regenerator detected by the second regenerator temperature detector. By constructing such a constitution, the control is carried out in accordance with the temperature of the regenerator having the highest temperature at that occasion in the first regenerator and the second regenerator and therefore, the heat input amount to the regenerator can further firmly be controlled.

Further, there is constructed a constitution in which when the combustion amount of the burner can be increased or reduced in steps by a plurality of stages, the controller determines to open and close the flow path open/close device and the combustion amount of the burner in accordance with a plurality of set temperatures previously set in correspondence with the temperature of the heat medium and the temperature of the heat medium detected by the heat medium temperature detector and thereafter, increases and reduces in steps the combustion amount of the burner to thereby increase and reduce in steps a heat input amount to the second regenerator in accordance with a plurality of set temperatures previously set in correspondence with the regenerator temperature and the regenerator temperature detected by the regenerator temperature detector.

Further, there is constructed a constitution in which when a combustion state of the burner can continuously be increased and reduced steplessly, the controller determines to open and close the flow path open/close device and stop to combust or combust the burner in accordance with the plurality of set temperatures previously set in correspondence with the temperature of the heat medium and the temperature of the heat medium detected by the heat medium temperature detector and when the burner is combusted, the controller determines the combustion amount of the burner based on a proportional relationship thereof with the temperature of the heat medium and thereafter determines the combustion amount of the burner based on the proportional relationship with the temperature of the heat medium by increasing and reducing in steps a maximum combustion limit previously set to the burner in accordance with the plurality of set temperatures previously set in correspondence with the regenerator temperature and the regenerator temperature detected by the regenerator temperature detector within a range not more than the maximum combustion amount limit to thereby continuously increase and reduce the heat input amount to the second regenerator.

By constructing such constitutions, in addition to enabling to promote reliability of the absorption chiller-heater, accuracy of controlling the function of cooling or warming the heat medium of the absorption chiller-heater in correspondence with the load can be promoted.

Further, there is constructed a constitution further comprising a cooling medium temperature detector for detecting a temperature of a cooling medium supplied to an absorber, wherein the controller changes values of the plurality of set temperatures previously set in correspondence with the regenerator temperature in accordance with the temperature of the cooling medium detected by the cooling medium temperature detector. By constructing such a constitution, the lower the temperature of the cooling solution, the lower the temperature of the second regenerator and therefore, the heat input amount until the regenerator temperature reaches a plurality of set temperatures previously set to the regenerator temperature can be restrained from being increased and therefore, fuel consumption at the second regenerator can be reduced and energy conservation performance can be promoted.

BRIEF DESCRIPTION OF THE DRAWINGS

FIGS. 2A and 2B illustrates diagrams showing a control of heat input amounts of respectively regenerators according to the first embodiment of the absorption chiller-heater constituted by applying the invention.

DETAILED DESCRIPTION OF THE PREFERRED EMBODIMENTS

First Embodiment

Figure 1:
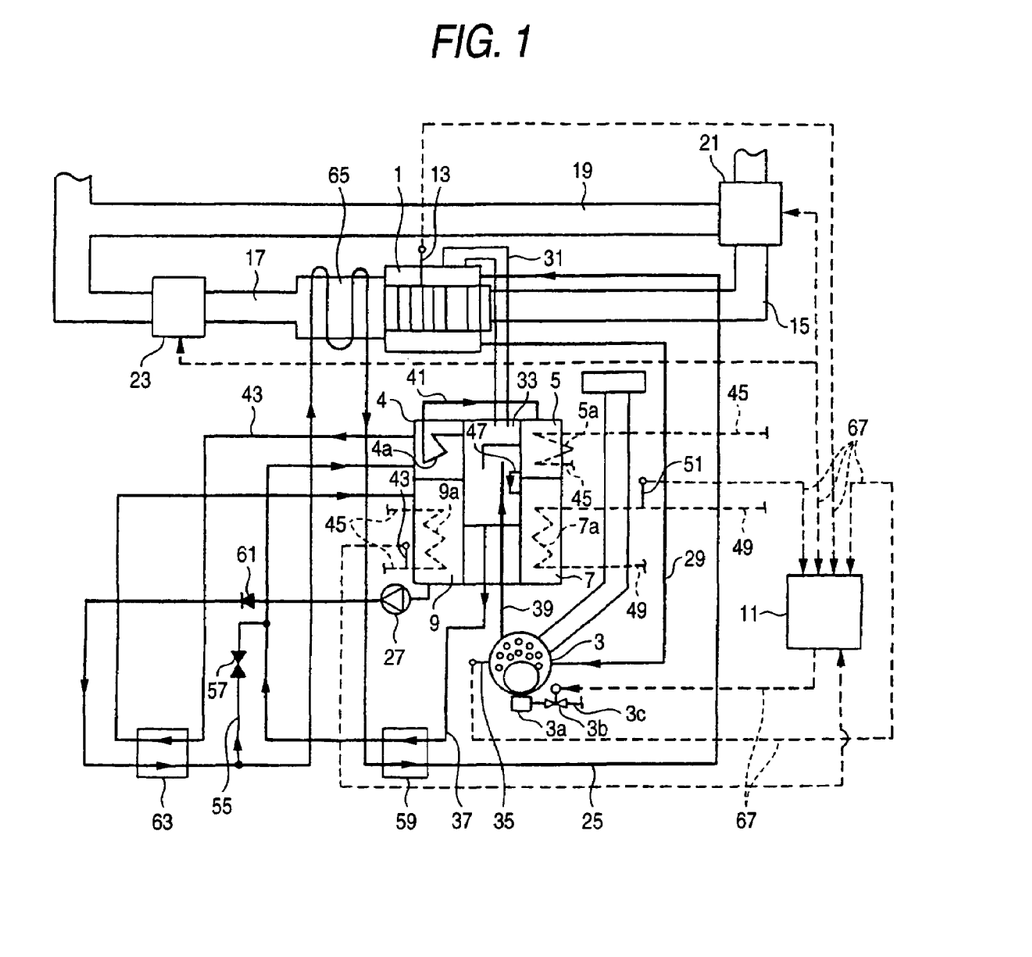
FIG. 1 is a diagram showing an outline constitution of a first embodiment of an absorption chiller-heater constituted by applying the invention.
Figure 2A:
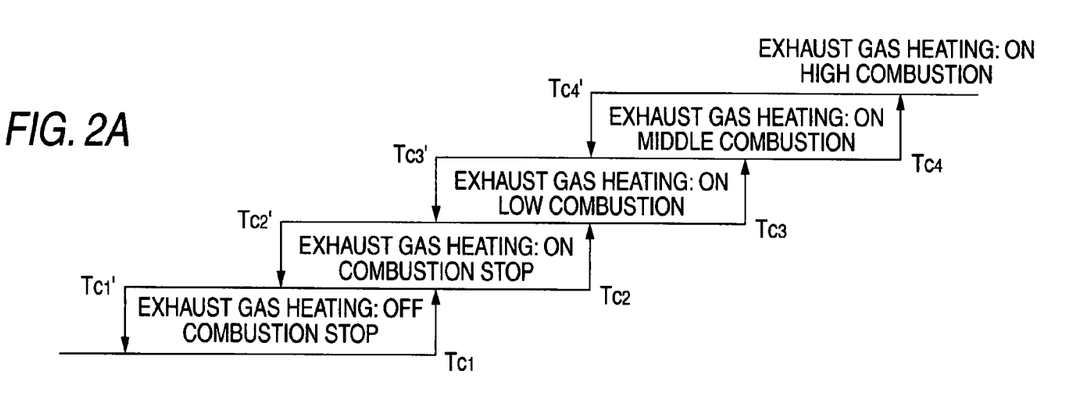
FIG. 2A is a diagram showing a control of heat input amounts to an exhaust heat fired regenerator and a second regenerator by an outlet temperature of cooled or warmed water and FIG. 2B is a diagram showing a control of the heat input amounts of the exhaust heat fired regenerator and the directly fired regenerator by a regenerator temperature.
Figure 2B:
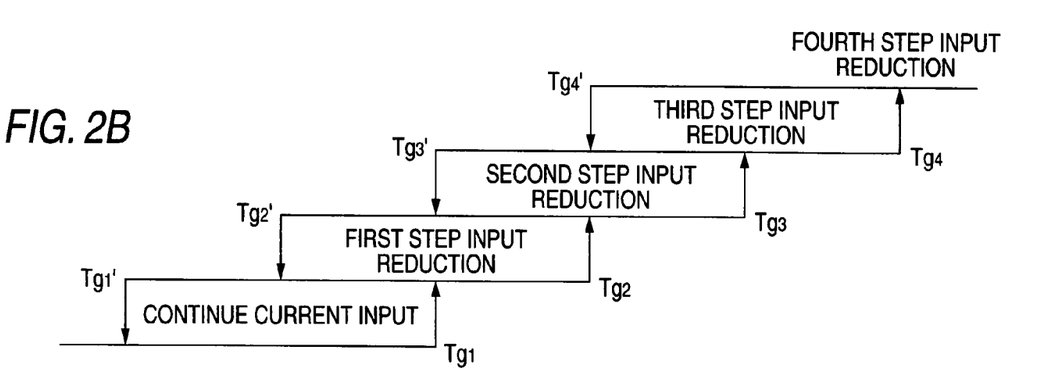
Figure 3:
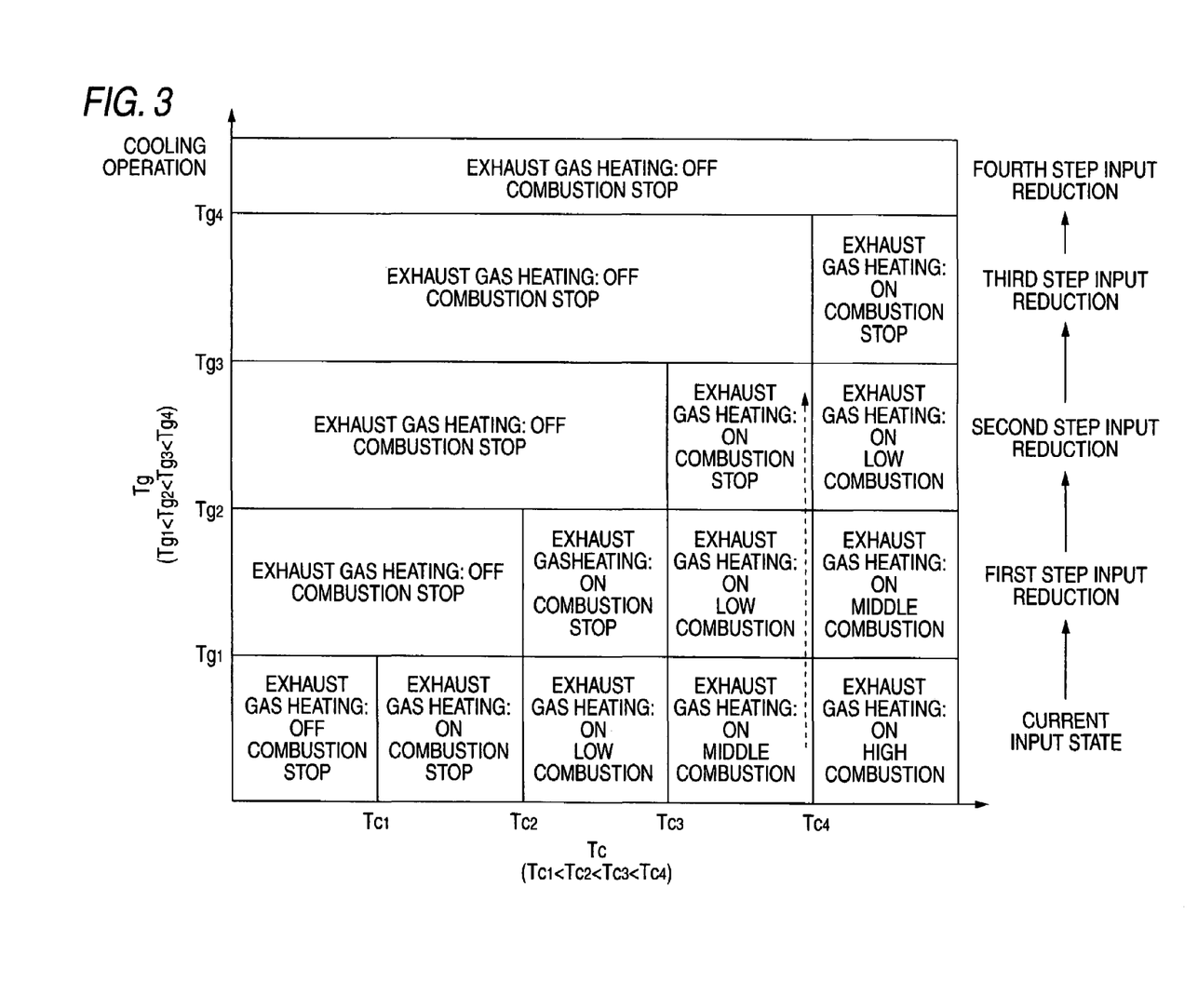
FIG. 3 is a schematic diagram showing a concept of controlling the heat input amounts of the exhaust heat fired regenerator and the directly fired regenerator by the outlet temperature of cooled or warmed water and the regenerator temperature according to the first embodiment of the absorption chiller-heater constituted by applying the invention.

An explanation will be given of a first embodiment of an absorption chiller-heater constituted by applying the invention in reference to FIG. 1 through FIG. 3 as follows. FIG. 1 is a diagram showing an outline constitution of an absorption chiller-heater constituted by applying the invention. FIGS. 2A and 2B illustrate diagrams showing a control of heat input amounts of respective regenerators of the absorption chiller-heater constituted by applying the invention, FIG. 2A is a diagram showing the control of the input amounts of an exhaust heat fired regenerator and a directly fired regenerator by an outlet temperature of cooled or warmed water and FIG. 2B is a diagram showing the control of the input amounts of the exhaust heat fired regenerator and the directly fired regenerator by a temperature of the regenerator. FIG. 3 is a schematic diagram showing a concept of the control of the input amounts of the exhaust heat fired regenerator and the directly fired regenerator by the outlet temperature of cooled water and the temperature of the regenerator of the absorption chiller-heater constituted by applying the invention. Further, according to the embodiment, an explanation will be given by taking an example of an absorption chiller-heater of a multi heat source drive type including a regenerator for providing input heat by making an exhaust gas flow directly in the regenerator, that is, an exhaust gas fired regenerator as the exhaust heat fired regenerator.

As shown by FIG. 1, the absorption chiller-heater of the embodiment is constituted by an exhaust gas fired regenerator 1, a directly fired regenerator 3, a low temperature regenerator 4, a condenser 5, an evaporator 7, an absorber 9, a control portion 11 and the like. The exhaust gas fired regenerator 1 corresponds to the first regenerator of the invention and is for carrying out heat exchange between exhaust gas from an external machine generating exhaust gas by combustion and a diluted solution and generating vapor of a cooling medium by heating the diluted solution by heat provided by the exhaust gas. Such an exhaust gas fired regenerator 1 is installed on the upper side of the directly fired regenerator 3 and the like. The directly fired regenerator corresponds to the second regenerator of the invention. Further, the exhaust gas fired regenerator 1 is provided with a first regenerator temperature sensor 13 for detecting temperature of the exhaust gas fired regenerator 1. The first regenerator temperature sensor 13 is for detecting temperature of an absorbent solution at inside of the exhaust gas fired regenerator 1 as temperature of the exhaust gas fired regenerator 1.

The exhaust gas fired regenerator 1 is connected with an introducing duct 15 constituting a guide flow path for guiding exhaust gas from external machine or the like for generating exhaust gas by combustion to a flow path of exhaust gas at inside of the gas fired regenerator 1 and an exhaust duct 17 constituting an exhaust flow path for exhausting exhaust gas from the flow path of the exhaust gas at inside of the exhaust gas fired regenerator 1. The introducing duct 15 and the exhaust gas 17 are connected with a bypass duct 19 branched from the introducing duct 15 and merged to the exhaust duct 17 to thereby constitute a bypass flow path. A branch portion of the introducing duct 15 and the bypass duct 19 is provided with a flow path switching device 21 constituting flow path open/close device of a valve, a damper or the like for switching flow of exhaust gas to the introducing duct 15 and the bypass duct 19. The flow path switching device 21 makes exhaust gas flow to the introducing duct 15 in a switched-on state and makes exhaust gas flow to the bypass duct 19 in a switched-off state.

A portion of the exhaust duct 17 on an upstream side of flow of exhaust gas of the merged portion of the bypass duct 19 and the exhaust duct 17 is provided with a cut-off device 23 constituting flow path open/close device of a valve, a damper or the like for cutting off flow of the exhaust gas. The cut-off device 23 is opened in a switched-on state and closed in a switched-off state to cut off the flow path of exhaust gas at inside of the exhaust duct 17. Further, a constitution of not installing the cut-off device 23 can also be constructed.

Such an exhaust gas fired regenerator is 1 is connected with a diluted solution passage 25 for guiding a diluted solution generated at the absorber 9 to a flow path of the diluted solution at inside of the exhaust gas fired regenerator 1. An outlet portion of the diluted solution passage 25 from the absorber 9 is provided with a pump 27 for delivering the diluted solution. The exhaust gas fired regenerator 1 is connected with one end of a solution passage 29 for making the diluted solution or a middle concentration solution at inside of the exhaust gas fired regenerator 1 flow. Other end of the solution passage 29 is connected to the directly fired regenerator 3. An upper portion of the exhaust fired regenerator 1 is connected with one end of a first cooling medium vapor passage 31 for making cooling medium vapor generated at inside of the exhaust gas fired regenerator 1 flow and other end of the first cooling medium vapor passage 31 is connected to a gas-liquid separator 33.

The directly fired regenerator 3 is for heating the diluted solution or the middle concentration solution from the exhaust gas fired regenerator 1 by combustion of a burner 3a and the burner 3a is connected with a fuel supply passage 3c having a fuel control valve 3b for combusting and stopping to combust the burner 3a. A combustion state of the burner 3a can be switched to 4 stages of 3 stages of combustion amounts of low combustion, middle combustion and high combustion and stopping of combustion. Further, the directly fired regenerator 3 is provided with a second regenerator temperature sensor 35 for detecting temperature of the directly fired regenerator 3. The second regenerator temperature sensor 35 is for detecting temperature of the middle concentration solution at inside of the directly fired regenerator 3 as temperature of the directly fired regenerator 3.

A bottom portion of the gas-liquid separator 33 is connected with one end of a middle concentration solution passage 37 for guiding the middle concentration solution stored at the bottom portion in the gas-liquid separator 33 to the low temperature generator 4. Other end of the middle concentration solution passage 37 is connected to the low temperature regenerator 4. An upper portion of the directly fired regenerator 3 is connected with one end of a solution lifting passage 39 for making cooling medium vapor generated at inside of the directly fired regenerator 3 flow and other end of the solution passage 39 is opened at inside of the gas-liquid separator 33.

Inside of the low temperature regenerator 4 is installed with a heat exchange flow path 4a communicated with inside of the gas-liquid separator 33 for making cooling medium vapor at inside of the gas-liquid separator 33 flow. The heat exchange flow path 4a is connected with a second cooling medium vapor passage 41 for guiding cooling medium vapor flowing at inside of the heat exchange flow path 4a heated by the low temperature regenerator 4 to the condenser 5. Further, the low temperature regenerator 4 is connected with one end of a concentrated solution pipe 43 for heating the middle concentration solution flowing via the middle concentration solution passage 37 by heat of cooling medium vapor flowing in the heat exchange flow path 4a to constitute a concentrated solution and thereafter delivering the concentrated solution to the absorber 9. Other end of the concentrated solution flow path 43 is connected to the absorber 9.

Inside of the condenser 5 is provided with a heat exchange flow path 5a forming a portion of a flow path of cooling water by being connected to a cooling water passage 45 in which cooling water constituting cooling medium flows. A bottom portion of the condenser 5 is connected with one end of a cooling medium passage 47 in which cooling medium produced by condensing and liquefying cooling medium vapor flows. Other end of the cooling medium passage 47 is connected to a cooling medium scattering portion, not illustrated, provided at inside of the evaporator 7. Inside of the evaporator 7 is connected with a heat exchange flow path 7a connected with a cooled or warmed flow path 49 in which indoor machine heat medium cooled or heated in the evaporator 7 and delivered to an indoor machine for air conditioning or the like, for example, water flows and the cooling medium scattering portion, not illustrated scatters cooling medium to the heat exchange flow path 7a. An outlet portion from the evaporator 7 of the cold temperature flow path 49 is provided with a heat medium temperature sensor 51 for detecting temperature of water at inside of the outlet portion of the cold temperature water passage 49.

The absorber 9 is actually communicated with the evaporator 7 although not illustrated in FIG. 1 and is constituted such that cooling medium vapor generated at the evaporator 7 can flow to the absorber 9. Inside of the absorber 9 is provided with a heat exchange flow path 9a forming a portion of a flow path of cooling water by being connected to the cooling water passage 45. Further, inside of the absorber 9 is provided with a concentrated solution scattering portion or the like, not illustrated, for scattering the concentrated solution to the heat exchange flow path 9a by being connected with the concentrated solution passage 43. A bottom portion of the absorber 9 is connected with one end of the diluted solution passage 25 for delivering the diluted solution generated by absorbing cooling medium vapor generated at the evaporator 7 by the concentrated solution to the exhaust gas fired regenerator 1. An inlet portion to the absorber 9 of the cooling water passage 45 is provided with a cooling medium temperature sensor 53 for detecting temperature of cooling water constituting cooling medium at inside of the inlet portion of the cooling water passage 45.

The middle concentration solution passage 37 is merged with a branch passage 55 branched from the diluted solution passage 25. The branch passage 55 is provided with a valve 57 for controlling flow of the diluted solution at inside of the branch passage 55. Further, a portion of the middle concentration solution passage 37 between the gas-liquid separator 33 and a merged portion thereof with the branch passage 55 is provided with high temperature heat exchanger 59 for carrying out heat exchange between the diluted solution flowing at inside of the diluted solution passage 25 and a solution flowing at inside of the middle concentration solution passage 37. Further, the high temperature heat exchanger 59 is provided at a portion of the diluted solution passage 25 on the downstream side of the branch portion of the diluted solution passage 25 and the branch passage 55 with respect to flow of the diluted solution.

A portion of the diluted solution passage 25 on the downstream side of the pump 27 with respect to flow of the diluted solution is provided with a check valve 61 and a portion of the diluted solution passage 25 on the downstream side of the check valve 61 with respect to flow of the diluted solution and on the upstream side of the branch portion of the branch passage 63 is provided with a low temperature heat exchanger 63 for carrying out heat exchange between the diluted solution flowing at inside of the diluted solution passage 25 and the concentrated solution flowing at inside of the concentrated solution passage 43. Further, a portion of the diluted solution passage 25 between the low temperature heat exchanger 63 and the high temperature heat exchanger 59 is provided with a heat exchanger 65 disposed on the downstream side of the exhaust gas fired regenerator 1 continuous to the exhaust gas fired regenerator 1. The heat exchanger 65 is for carrying out heat exchange between exhaust gas and the diluted solution. Further, the cooling water path 45 is arranged to circulate cooling water from the absorber 9 to a cooling tower, not illustrated, by passing the condenser 5.

The control portion 11 is electrically connected with the first regenerator temperature sensor 13, the second regenerator temperature sensor 35, the heat medium temperature sensor 51, the cooling medium temperature sensor 53, the flow path switching device 21 and the cut-off device 23, the fuel control valve 3b and the like respectively via wirings 67. Further, although sensors are installed other than these, the sensors are not directly related to the invention and therefore, the sensors are omitted.

An explanation will be given of a control of heat input amounts of the exhaust gas fired regenerator and the directly fired regenerator of the absorption chiller-heater having such a constitution and a characterizing portion of the invention. Further, when the control portion 11 does not receive a drive signal from external machine generating exhaust gas, that is, when exhaust gas is not generated, the control portion 11 transmits off signals to the flow path switching device 21 and the cut-off device 23 to thereby make exhaust gas flow to the bypass duct 19 and the closes a flow path of exhaust gas reaching the introducing duct 15, the exhaust gas fired regenerator 1 and the exhaust duct 17 by the flow path switching device 21 and the cut-off device 23. Meanwhile, when the control portion 11 receives the drive signal from external machine generating exhaust gas, the control portion 11 switches on and off the flow path switching device 21 and the cut-off device 23 in accordance with an outlet temperature from the evaporator 7 of cooled or warmed water, and a higher one of temperatures of the exhaust gas fired regenerator 1 and the directly fired regenerator 3, that is, the regenerator temperature to control flow of exhaust gas to the exhaust gas fired regenerator 1. An explanation will be given here of a case of carrying out cooling operation when the control portion 11 of the absorption chiller-heater used in an air conditioning system receives the drive signal from the external machine generating the exhaust gas and exhaust heat can be utilized.

When normal operation is started when the drive signal from the external machine generating the exhaust gas is received, the control portion 11 determines heat input to the exhaust gas fired regenerator 1 and a combustion state of the burner 3a of the directly fired regenerator 3 in accordance with the outlet temperature of the evaporator 3 of cooled water detected by the heat medium temperature sensor 51. At this occasion, the control portion 11 is inputted with set temperatures Tc1, Tc2, Tc3, Tc4 when a heat input amount is increased and set temperatures Tc1', Tc2', Tc3', Tc4' when the heat input amount is reduced as four set temperatures previously set in correspondence with the outlet temperature from the evaporator 7 of cooled water. Further, it is assumed that Tc1<Tc2<Tc3<Tc4 and Tc1'<Tc2'<Tc3'<Tc4'.

The control portion 11 compares the outlet temperature of cooled water detected by the heat medium temperature sensor 51 and the set temperatures, as shown by FIG. 2A, for example, after the outlet temperature of cooled water becomes equal to or higher than the set temperature Tc3, when the outlet temperature of cooled water falls in a range higher than Tc3' and lower than Tc4, the control portion 11 makes exhaust gas flow to the exhaust fired regenerator 1 by transmitting on instruction signals to the flow path switching device 21 and the cut-off device 23 and transmits a middle combustion instruction signal for controlling a valve opening degree to an opening degree of carrying out middle combustion to the fuel control value 3b of the directly fired regenerator 3. Thereby, heat input, that is, input is produced to the exhaust gas fired regenerator 1 by exhaust gas and to the directly fired regenerator 3 by middle combustion of the burner 3a.

At this occasion, the control portion 11 monitors temperatures of the exhaust gas fired regenerator 1 and the directly fired regenerator 3 by the first regenerator temperature sensor 13 and the second regenerator temperature sensor 35, sets the regenerator temperature by a higher one of either temperature of temperatures of the exhaust gas fired regenerator 1 and the directly firing the regenerator 3 and controls the combustion state of the burner 3a of the directly fired regenerator 3 or flow of exhaust gas to the exhaust gas fired regenerator 1 in accordance with the regenerator temperature. The control portion 11 is inputted with set temperatures Tg1, Tg2, Tg3, Tg4 when the heat input amount is reduced and set temperatures Tg1', Tg2', Tg3', Tg4' when the heat input amount is increased as four set temperatures previously set in correspondence with the regenerator temperature. Further, it is assumed that Tg1<Tg2<Tg3<Tg4 and Tg1'<Tg2'<Tg3'<Tg4'.

The control portion 11 sets the regenerator temperature by a higher one of either temperature of temperatures of the respective regenerators detected by the first regenerator temperature sensor 13 and the second regenerator temperature 35 and compares the regenerator temperature and the set temperatures and as shown by FIG. 2B, when, for example, the regenerator temperature is not equal to or higher than the set temperature Tg1, maintains a current state of heat input amounts, that is, a state of inputting heat to the exhaust gas fired regenerator 1 by exhaust gas and inputting heat to the directly fired regenerator 3 by middle combustion of the burner 3a. When the regenerator temperature is elevated to be equal to or higher than the set temperature Tg1, the input amounts are reduced by once stage. At this occasion, a combustion amount of the burner 3a of the directly fired regenerator 3 is predominantly reduced. Therefore, when the regenerator temperature is elevated to be equal to or higher than the set temperature Tg1, the control portion 11 transmits a low combustion instruction signal for controlling the valve opening to an opening for carrying out low combustion in which the combustion amount is reduced by one stage from middle combustion to the fuel control valve 3b of the directly fired regenerator 3. Thereby, heat is inputted to the exhaust gas fired regenerator 1 by exhaust gas and heat is inputted to the directly fired regenerator 3 by low combustion of the burner 3a and the heat input amount is reduced by one stage.

When the regenerator temperature is elevated to be equal to or higher than the set temperature Tg2, the control portion 11 reduces the heat input amount further by one stage to bring about a state in which the heat input amount is reduced from the heat input amount determined by the outlet temperature of cooled water by two stages. Therefore, when the regenerator temperature is elevated to be equal to or higher than the set temperature Tg2, the control portion 11 transmits a combustion stop instruction signal for cutting off the valve to the fuel control valve 3b of the directly fired regenerator 3 to stop combustion. Thereby, heat is not inputted to the directly fired regenerator 3 and heat is only inputted to the exhaust gas fired regenerator 1 by exhaust gas and the heat input amount is reduced further by one stage.

When the regenerator temperature is elevated to be equal to or higher than the set temperature Tg3, the control portion 11 reduces the heat input amount further by one stage to bring about a state in which the heat input amount is reduced from the heat input amount determined by the outlet temperature of cooled water by three stages. Therefore, when the regenerator temperature is elevated to be equal to or higher than the set temperature Tg3, since combustion of the burner 3a of the directly fired regenerator 3 is stopped, the control portion 11 transmits an off instruction signal to the exhaust fired regenerator 1, opens the flow path of the bypass dumper 19 by switching the flow path switching device 21 to bring about a state of closing the flow path of the introducing duct 15 and brings about a state of closing the flow path of the exhaust duct 17 by closing the cut-off device 23. Thereby, heat is not inputted to the directly fired regenerator 3 and heat is not inputted to the exhaust gas fired regenerator 1.

FIG. 3 schematically shows a concept of such an input control in accordance with the outlet temperature of cooled water and the regenerator temperature by the control portion 11. The flow of control exemplified up to this point is a flow in a vertical direction designated by an arrow mark of a broken line in FIG. 3. Further, although in FIG. 3, the set temperatures Tc1, Tc2, Tc3, Tc4 when the heat input amount is increased are shown as the set temperatures in correspondence with the outlet temperature of cooled water, when the heat input amount is reduced, the set temperature Tc1', Tc2', Tc3', Tc4' substitute for the set temperatures Tc1, Tc2, Tc3, Tc4. Similarly, although the set temperatures Tg1, Tg2, Tg3, Tg4 when the heat input amount is reduced are shown as the set temperatures in correspondence with the regenerator temperature, when the heat input amount is increased, the set temperatures Tg1', Tg2', Tg3', Tg4' substitute for the set temperatures Tg1, Tg2, Tg3, Tg4. Although the set temperatures in correspondence with the outlet temperature of cooled water and set temperatures in correspondence with the regenerator temperature can also be constituted by single ones of the set temperatures Tc1, Tc2, Tc3, Tc4 and the set temperatures Tg1, Tg2, Tg3, Tg4 regardless of an increase or a reduction in the heat input amount, since there is a case of frequently changing the combustion amount, as shown by FIGS. 2A and 2B, it is preferable to differ the set temperatures when the heat input amount is increased and the set temperatures when the heat input amount is reduced from each other with intervals therebetween.

When the set temperatures in increasing the heat input amount and the set temperatures in reducing the heat input amount differ from each other with intervals therebetween in this way, for example, after the regenerator temperature is elevated to be equal to or higher than the set temperature Tg3, when the regenerator temperature becomes equal to or lower than Tg3', as shown by FIG. 2B, the heat input amount is increased by one stage to return to the state in which the heat input amount is reduced by two stages from the heat input amount determined by the outlet temperature of cooled water. Therefore, when the regenerator temperature is lowered to be equal to or lower than the set temperature Tg3', the control portion 11 transmits an on instruction signal to the exhaust gas fired regenerator 1, closes the flow path of the bypass duct 19 by switching the flow path switching device 21 to bring about the state of opening the flow path of the introducing duct 15 and to bring about the state of opening the flow path of the exhaust duct 17 by opening the cut-off device 23. Thereby, exhaust gas is made to flow to the exhaust gas fired regenerator 1 to bring about the input and the input is increased by one stage.

Further, when the regenerator temperature is lowered to be equal to or lower than the set temperature Tg2', the control portion 11 increases the heat input amount further by one stage to bring back the state in which the heat input amount is reduced by one stage from the heat input amount determined by the outlet temperature of cooled water. Therefore, when the regenerator temperature is lowered to be equal to or lower than the set temperature Tg2', the control portion 11 transmits a low combustion instruction signal for cutting off the valve to the fuel control valve 3b of the directly fired regenerator 3 to start low combustion. Thereby, the input to the directly fired regenerator 3 is produced by low combustion in addition to the input to the exhaust gas fired regenerator 1 to increase the heat input amount further by one stage.

Meanwhile, assume that when the outlet temperature from the evaporator 7 of cooled water detected by the heat medium temperature sensor 51, that is, the outlet temperature of cooled water is changed, as shown by FIG. 3, the control portion 11 carries out a control maintaining a stage of an increase or a reduction in the input determined in accordance with the regenerator temperature, that is, a stage of an increase or a reduction in the input such as one stage input reduction or two stages input reduction from the input state determined in accordance with the outlet temperature of cooled water.

For example, assume that the outlet temperature of cooled water detected by the heat medium temperature sensor 51 is between the set temperatures Tc3' and Tc4 as shown by FIG. 2A, the exhaust gas fired regenerator 1 is switched on and the burner 3a of the directly fired regenerator 3 selects middle combustion, the regenerator temperature becomes equal to or lower than the set temperature Tg2', the stage of the increase or the reduction in the input becomes one stage input reduction, the exhaust gas fired regenerator 1 is switched on and the burner 3a of the directly fired regenerator 3 becomes low combustion. At this occasion, when the cooled water temperature is elevated and the outlet temperature of cooled water exceeds the set temperature Tc4, the input is increased by one stage and the burner 3a of the directly fired regenerator 3 becomes middle combustion. That is, in accordance with FIG. 2A, when the outlet temperature of cooled water exceeds the set temperature Tc4, there is brought about a state in which the exhaust gas fired regenerator 1 is switched on and the burner 3a of the directly fired regenerator 3 becomes high combustion, however, since the stage of the increase or the reduction of the input becomes one stage input reduction in accordance with the regenerator temperature, there is brought about a state of middle combustion in which the input of the burner 3a of the directly fired regenerator 3 is reduced by one stage more than that of high combustion.

In this way, after the stage of the increase or the reduction in the input is determined in accordance with the regenerator temperature and when the outlet temperature of cooled water is changed, in FIG. 3, the control portion 11 carries out a control of a flow in a horizontal direction as shown by an arrow mark indicated by one-dotted chain line in a row in correspondence with the determined stage of the increase or the reduction in the input, for example, a control of flow in the horizontal direction maintaining the state of one stage input reduction.

Further, in the case of heating operation, there is carried out a control similar to that of cooling operation except differences in numerical values of set temperatures in correspondence with the outlet temperature, that is, warmed water temperature from the evaporator 7 and the regenerator temperature and that when the warm water temperature is lowered, the combustion amount is increased. Further, when exhaust heat cannot be utilized, there is similarly carried out a control of the combustion amount of the burner 3 by controlling the fuel control vale 3b of the directly fired regenerator 3 except that the flow path switching device 21 and the cut-off device 23 of the exhaust gas fired regenerator 1 are brought into a normally switched-off state.

In this way, according to the absorption chiller-heater of the embodiment, the heat input amount to the exhaust gas fired regenerator 1 can be controlled by controlling the flow path switching device 21 and the cut-off device 23 in accordance with the outlet temperature of the evaporator 7 of cooled water detected by the heat medium temperature sensor 51 and the regenerator temperature of a higher one of either of the temperature of the exhaust gas fired regenerator 1 detected by the first regenerator temperature sensor 13 and the temperature of the directly fired regenerator 3 detected by the regenerator temperature sensor 35.

Further, the burner 3a of the directly fired regenerator 3 can be controlled to increase or reduce the combustion amount in four stages including the stoppage of the burner 3a and the increase or the reduction in the combustion amount of the burner 3a is controlled in accordance with the outlet temperature from the evaporator 7 of cooled water detected by the heat medium temperature sensor 51 and a higher one of temperature of the temperature of the exhaust heat fired regenerator 1 detected by the first regenerator temperature sensor 13 and the temperature of the directly fired regenerator 3 detected by the second regenerator temperature sensor 35. Therefore, the heat input amount of the directly fired regenerator 3 can be increased or reduced by increasing or reducing the combustion amount of the burner 3a in four stages and it is difficult to bring about a state in which the temperature of the directly fired regenerator or the like is elevated intermittently and excessively as in the case in which the input amount of the directly fired regenerator is controlled by two stages of combusting and stopping the burner.

Therefore, even when the heat amount or the load of exhaust heat is varied, a total heat input amount to the respective regenerators 1' 3 is difficult to be excessive, stoppage of operation by abnormal temperatures of the respective regenerators 1, 3, crystallization of the absorbent solution, corrosion of the regenerator can be restrained from being brought about and reliability of the absorption chiller-heater can be promoted.

Further, there can be restrained variations in temperature and pressure of the regenerator in a comparatively short period of time which is brought about when the heat input amount of the directly fired regenerator is controlled by two stages of combusting and stopping to combust the burner and durability of the absorption chiller-heater can be promoted.

In addition thereto, the heat input amount can be increased or reduced by increasing or reducing the combustion amount of the burner 3a of the directly fired regenerator 3 in plural stages and therefore, function thereof can be controlled further finely and accuracy of controlling the function of cooling or heating the heat medium of the absorption chiller-heater can be promoted in accordance with the increase or the reduction in the change of the load of the air conditioning load or the like or the exhaust heat amount. Further, by enabling to promote accuracy of controlling the function of cooling or heating the heat medium of the absorption chiller-heater in correspondence with the change in the load of the air conditioning load or the like or the increase or the reduction in the exhaust heat amount, air conditioning outlet can be stabilized, further, fuel combustion of the burner can be restrained and the energy conservation performance can further be promoted.

Further, according to the embodiment, the combustion state of the burner 3a of the directly fired regenerator 3 can be switched in four stages including stoppage of the combustion, further, the respective four set temperatures are set in correspondence with the set temperature in correspondence with the outlet temperature of cooled or warmed water from the evaporator 7 and the regenerator temperature. However, a number of stages of switching the combustion state of the burner 3a of the directly fired regenerator 3 and numbers of the set temperatures in correspondence with the outlet temperature of cooled or warmed water and the set temperatures in correspondence with the regenerator temperature can pertinently be set.

Second Embodiment

Figure 4:
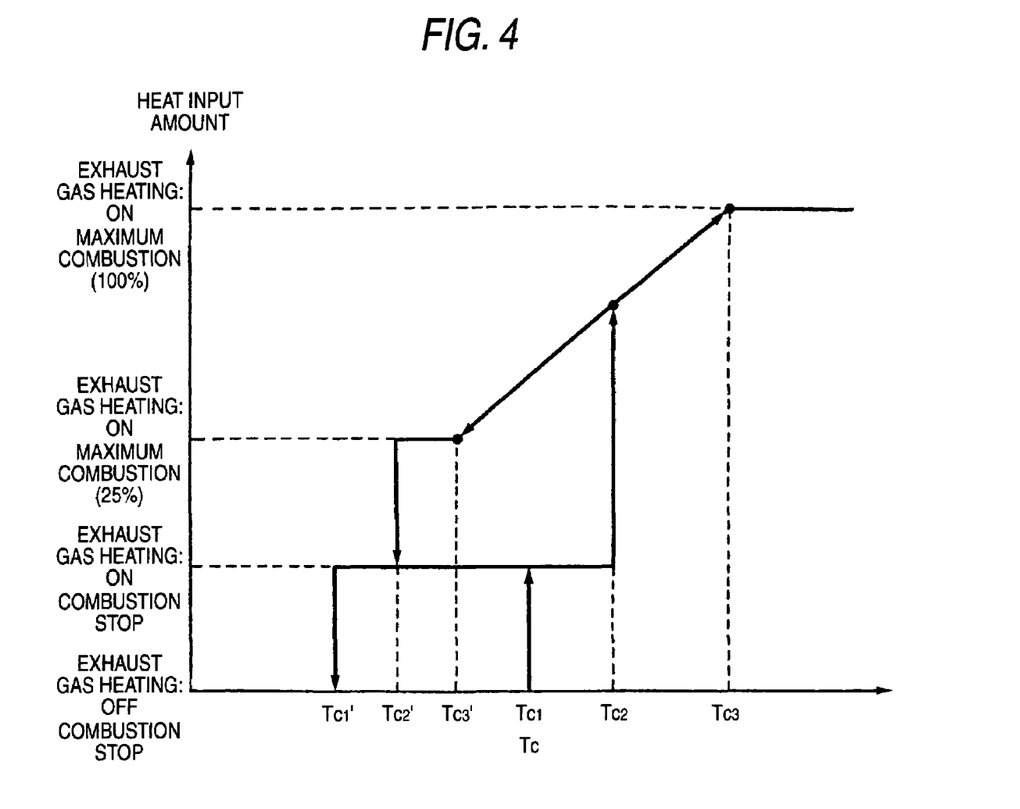
FIG. 4 is a diagram showing a control of heat input amounts of an exhaust heat fired regenerator and the directly fired regenerator by an outlet temperature of cooled or warmed water according to a second embodiment of an absorption chiller-heater constituted by applying the invention.
Figure 5:
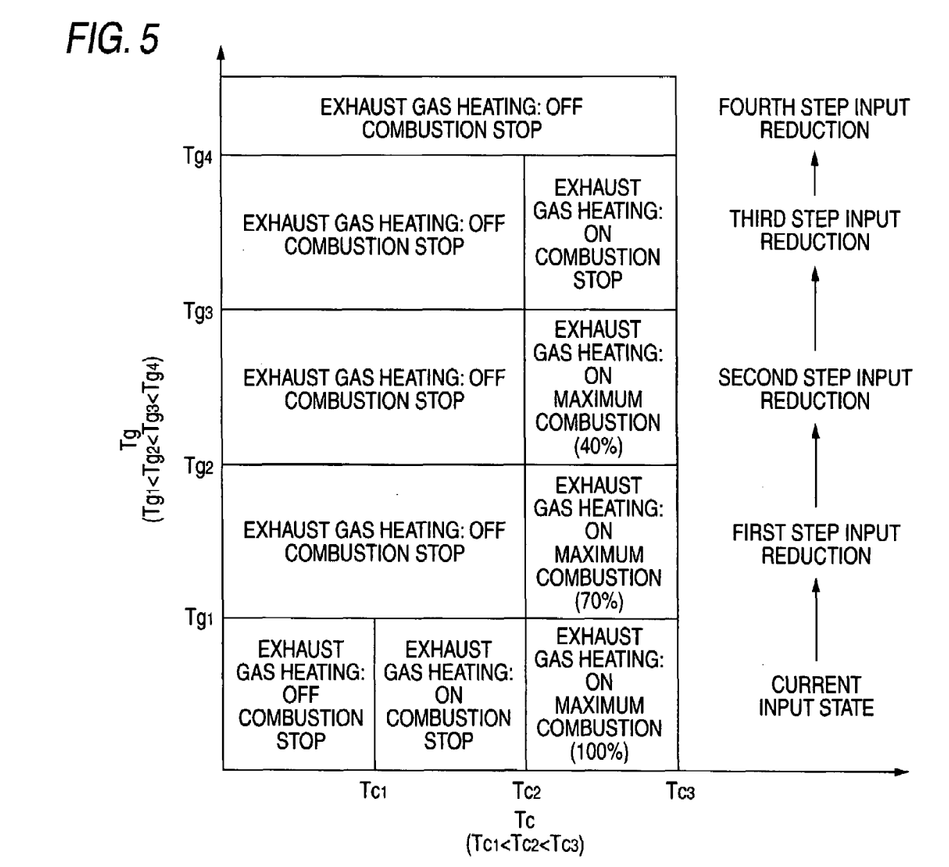
FIG. 5 is a schematic diagram showing a concept of the control of the heat input amounts of the exhaust heat fired regenerator and the directly fired regenerator by the outlet temperature of cooled water and the regenerator temperature according to the second embodiment of the absorption chiller-heater constituted by applying the invention.

An explanation will be given of a second embodiment of an absorption chiller-heater constituted by applying the invention in reference to FIG. 1, FIGS. 2A and 2B, FIG. 4 and FIG. 5 as follows. FIG. 4 is a diagram showing a control of the heat input amounts of the exhaust heat fired regenerator and the directly fired regenerator by the outlet temperature of cooled or warmed water of the absorbing type water cooling or warming machine constituted by applying the invention. FIG. 5 is a schematic view showing a concept of the control of the heat input amounts of the exhaust gas fired regenerator and the directly fired regenerator by the outlet temperature of cooled water and the regenerator temperature of the absorption chiller-heater constituted by applying the invention. Further, according to the embodiment, a constitution or the like same as that of the first embodiment is attached with the same notation and an explanation thereof will be omitted and an explanation will be given of a characterizing portion or the like which differs from that of the first embodiment.

A point of the embodiment which differs from the first embodiment resides in that the combustion amount of the burner provided to the directly fired regenerator can continuously be increased or reduced and the control portion proportionally controls the combustion amount of the burner in accordance with the outlet temperature of cooled or warmed water and the regenerator temperature of the absorption chiller-heater. That is, although the absorption chiller-heater of the embodiment is constructed by a constitution similar to that of the first embodiment as shown by FIG. 1, the valve opening degree of the fuel control valve 3b can continuously be controlled and therefore, the burner 3a is constructed by a constitution capable of continuously increasing or reducing the combustion amount.

Similar to the first embodiment, in starting normal operation when the control portion 11 of the embodiment receives the drive signal from external machine generating exhaust gas, the control portion 11 determines the heat input to the exhaust gas fired regenerator 1 and the combustion state of the burner 3a of the directly fired regenerator 3 in accordance with the outlet temperature from the evaporator 7 of cooled water detected by the heat medium temperature sensor 51. At this occasion, the control portion 11 is inputted with the set temperatures Tc1, Tc2 when the heat input amount is increased in steps, set temperatures Tc1', Tc2' when the heat input amount is reduced in steps and set temperatures Tc3, Tc3' in a range of proportionally increasing or reducing the heat input amount as six set temperatures previously set in correspondence with the outlet temperature from the evaporator 7 of cooled water. Further, as shown by FIG. 4, Tc1<Tc2<Tc3 and Tc1'<Tc2'<Tc3', the control portion 11 proportionally controls the combustion amount of the burner 3a in correspondence with the outlet temperature from the evaporator 17 of cooled water, that is, the outlet temperature of cooled water between the set temperatures Tc3' and Tc3.

The control portion 11 compares the outlet temperature of cooled water detected by the heat medium temperature sensor 51 and the set temperature and when the outlet temperature of cooled water is equal to or higher than the set temperature Tc2, the control portion 11 transmits on instruction signals to the flow path switching device 21 and the cut-off device 23 to bring about the state in which exhaust gas is made to flow to the fuel control valve 3b of the exhaust gas fired regenerator 1 and transmits a combustion instruction signal to the fuel control valve 3b of the directly fired regenerator 3. Thereby, there is brought about a state of producing the inputs to both of the exhaust gas fired regenerator 1 and the directly fired regenerator 3. Even when the outlet temperature of cooled water is lowered, so far as the outlet temperature is equal to or higher than the set temperature Tc2', a state in which exhaust gas is made to flow to the exhaust gas fired regenerator 1 and a state in which the burner 3a of the directly fired regenerator 3 is combusted are maintained.

However, when the outlet temperature of cooled water is lower than the set temperature Tc2' and is equal to or higher than the set temperature Tc1' and less than Tc2, in a state in which on instruction signals are transmitted to the flow path switching device 21 and the cut-off device 23 and exhaust gas is made to flow to the exhaust gas fired regenerator 1, a combustion stop instruction signal is transmitted to the fuel control valve 3b of the directly fired regenerator 3 and the burner 3a of the directly fired regenerator 3 is brought into a combustion stop state. Thereby, there is brought about a state of producing the input only to the exhaust gas fired regenerator 1. When the outlet temperature of cooled water is further lowered to be equal to or lower than the set temperature Tc1', off instruction signals are transmitted to the flow path switching device 21 and the cut-off device 23 to bring about a state in which exhaust gas does not flow to the exhaust gas fired regenerator 1. Thereby, there is brought about a state in which inputs are not produced to both of the exhaust gas fired regenerator 1 and the directly fired regenerator 3.

When the outlet temperature of cooled water exceeds the set temperature Tc2 and thereafter is equal to or higher than the set temperature Tc3' and equal to or lower than Tc3, the control portion 11 carries out a control of making exhaust gas flow to the exhaust gas fired regenerator 1 and increasing or reducing the combustion amount of the burner 3a of the directly fired regenerator 3 in proportion to the outlet temperature of cooled water, for example, between 25% through 100%. When the outlet temperature of cooled water is equal to or higher than the set temperature Tc3, exhaust gas is made to flow to the exhaust heat fired regenerator 1 and the burner 3a of the directly fired regenerator 3 is combusted by a combustion amount of 100%. Further, when the outlet temperature of cooled water is equal to or higher than the set temperature Tc2' and less than Tc3', exhaust gas is made to flow to the exhaust heat fired regenerator 1 and the burner 3a of the directly fired regenerator 3 is combusted by a combustion amount of 25%.

At this occasion, the control portion 11 monitors temperatures of the exhaust gas fired regenerator 1 and the directly fired regenerator 3 by the first regenerator temperature sensor 13 and the second regenerator temperature sensor 35 and carries out a control of restricting a maximum combustion amount by constituting the regenerator temperature by a higher one of either temperature of temperatures of the exhaust gas fired regenerator 1 and the directly fired regenerator 3 and determining a maximum combustion limit of the burner 3a of the directly fired regenerator 3 previously inputted in accordance with the regenerator temperature. For example, the control portion 11 is inputted with, for example, four set temperatures, Tg1, Tg2, Tg3, Tg4 when the heat input amount is reduced, and four set temperature Tg1', Tg2', Tg3', Tg4' when the heat input amount is increased as set temperatures previously set in correspondence with the regenerator temperature. It is assumed that Tg1<Tg2<Tg3<Tg4 and Tg1'<Tg2'<Tg3'<Tg4'. Further, a relationship between the set temperatures Tg1, Tg2, Tg3, Tg4 and set temperatures Tg1', Tg2', Tg3', Tg4' is as shown by FIG. 2B.

When the outlet temperature of cooled water exceeds the set temperature Tc2 and thereafter, is equal to or higher than the set temperature Tc3' and equal to or lower than Tc3, as shown by FIG. 4 and FIG. 5, when the regenerator temperature is less than Tg1, the control portion 11 makes exhaust gas flow to the exhaust gas fired regenerator 1, sets the maximum combustion amount of the burner 3a of the directly fired regenerator 3 to 100% and proportionally controls the combustion amount of the burner 3a of the directly fired regenerator 3 in correspondence with the outlet temperature of cooled water within the range, that is, in a range equal to or higher than 25% and equal to or less than 100%. When the regenerator temperature is equal to or higher than Tg1 and less than Tg2, exhaust gas is made to flow to the exhaust gas fired regenerator 1, the maximum combustion amount of the burner 3a of the directly fired regenerator 3 is restricted to, for example, 70% and the combustion amount of the burner 3a of the directly fired regenerator 3 is proportionally controlled in correspondence with the outlet temperature of cooled water within the range, that is, in a range equal to or higher than 25% and less than 70%. When the regenerator temperature is equal to or higher than Tg2 and less than Tg3, exhaust gas is made to flow to the exhaust gas fired regenerator 1, the maximum combustion amount of the burner 3a of the directly fired regenerator 3 is restricted to, for example, 40% and the combustion amount of the burner 3a of the directly fired regenerator 3 is proportionally controlled in correspondence with the outlet temperature of cooled water within the range, that is, within a range equal to or higher than 25% and less than 40%.

Further, when the regenerator temperature is equal to or higher than Tg3 and less than Tg4, although the control portion 11 makes exhaust gas flow to the exhaust heat fired regenerator 1, the control portion 11 stops combusting the burner 3a of the directly fired regenerator 3 by transmitting a combustion stop instruction signal to the burner 3a of the directly fired regenerator 3. When the regenerator temperature is equal to or higher than Tg4, off instruction signals are transmitted to the flow path switching device 21 and the cut-off device 23 to thereby bring about a state in which flow of exhaust gas to the exhaust heat fired regenerator 1 is cut off to bring about a state in which the inputs are not produced to the exhaust heat fired regenerator 1 and the directly fired regenerator 3.

Even in such an absorption chiller-heater of the embodiment, an effect similar to that of the first embodiment can be achieved.

Further, according to the embodiment, a range of proportionally controlling the combustion amount of the burner 3a of the directly fired regenerator 3 is set to be equal to or higher than 25% and equal to or lower than 100% and three stages of limit values of 40%, 70%, 100% are set as the maximum combustion limits of the burner 3a of the directly fired regenerator 3. Further, six and eight of the set temperatures in correspondence with the outlet temperature of cooled or warmed water from the evaporator 7 and the set temperatures in correspondence with the regenerator temperature are respectively set. However, the range of proportionally controlling the combustion amount of the burner 3a of the directly fired regenerator 3, values of the limit values and numbers of the set temperatures in correspondence with the outlet temperature of cooled or warmed water and the set temperatures in correspondence with the regenerator temperature can pertinently be set.

Third Embodiment

Figure 6:
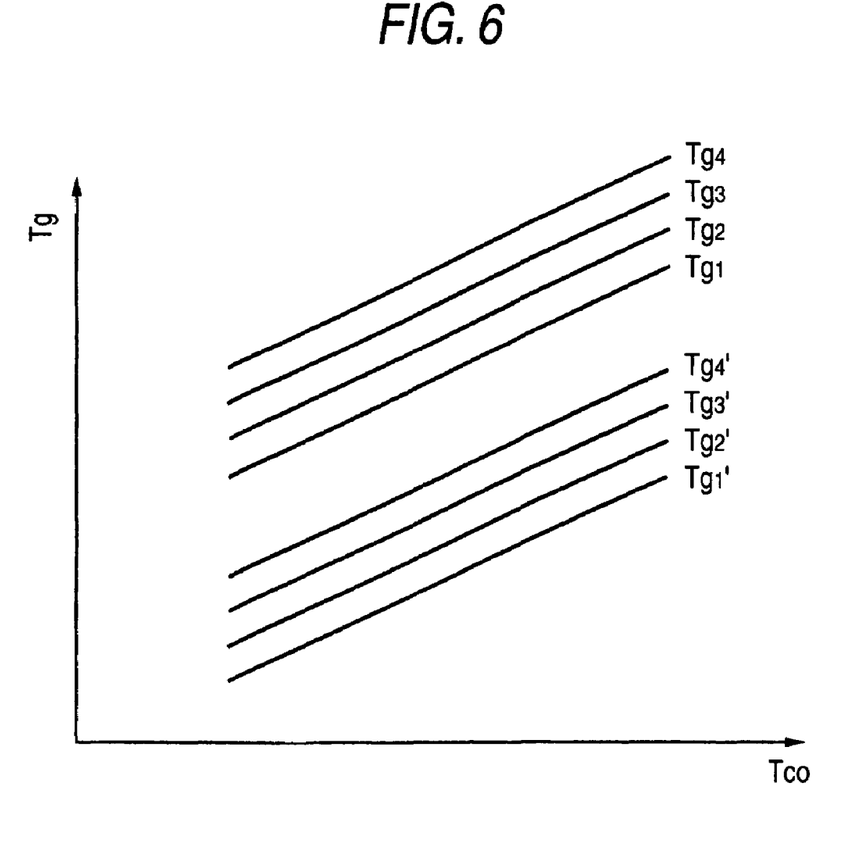
FIG. 6 is a diagram for explaining a way of determining a set temperature in correspondence with the regenerator temperature in correspondence with an inlet temperature of cooling water according to a third embodiment of an absorption chiller-heater constituted by applying the invention.
Figure 7:
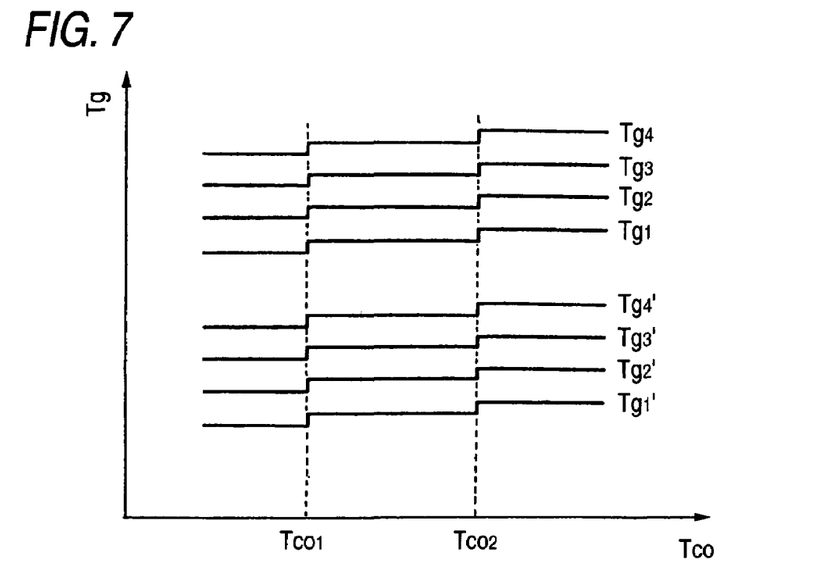
FIG. 7 is a diagram for explaining other way of determining the set temperature in correspondence with the regenerator temperature in correspondence with the inlet temperature of cooling water according to the third embodiment of the absorption chiller-heater constituted by applying the invention.
Figure 8:
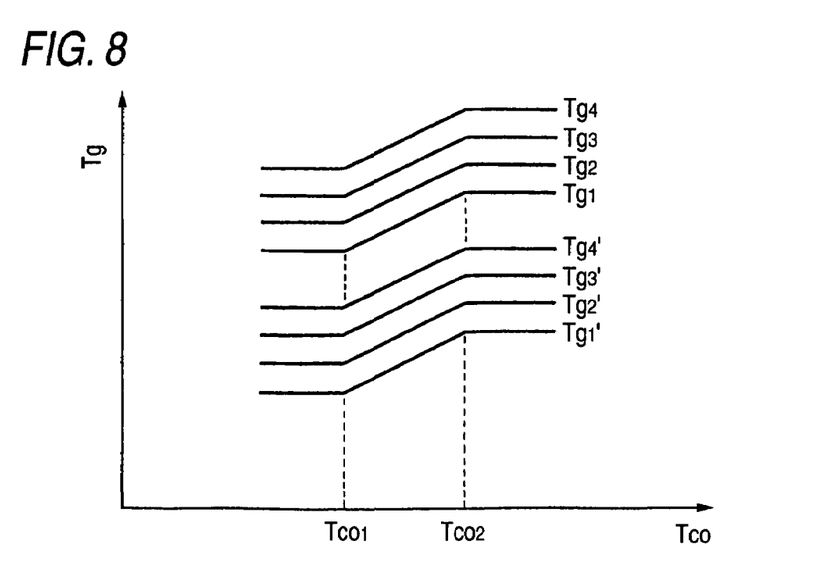
FIG. 8 is a diagram for explaining still other method of determining the set temperature in correspondence with the regenerator temperature in correspondence with the inlet temperature of cooling water according to the third embodiment of the absorption chiller-heater constituted by applying the invention.

An explanation will be given of a third embodiment of an absorption chiller-heater constituted by applying the invention in reference to FIG. 1, FIG. 6, FIG. 7 and FIG. 8 as follows. FIG. 6 is a diagram for explaining a way of determining a set temperature in correspondence with the regenerator temperature in correspondence with the inlet temperature of cooling water of the absorption chiller-heater constituted by applying the invention. FIG. 7 is a diagram for explaining other way of determining the set temperature in correspondence with the generator temperature in correspondence with the input temperature of cooling water of the absorption chiller-heater constituted by applying the invention. FIG. 8 is a diagram for explaining still other way of determining the set temperature in correspondence with the regenerator temperature in correspondence with the inlet temperature of cooling water of the absorption chiller-heater constituted by applying the invention. Further, according to the embodiment, a constitution or the like the same as those of the first and the second embodiments is attached with the same notation, an explanation thereof will be omitted and an explanation will be given of a characterizing portion or the like which differs from those of the first and the second embodiments.

Although the embodiment carries out a control similar to those of the first and the second embodiments, the embodiment differs in that an inlet temperature to the absorber of cooling water is detected and the set temperature in correspondence with the regenerator temperature is changed in accordance with the inlet temperature of cooling water.

For example, as shown by FIG. 1, the lower the temperature of cooling water supplied from the cooling water passage 45 to the absorber 9, that is, the inlet temperature to the absorber 9 of cooling water, the lower the temperature of the directly fired regenerator 3 and therefore, the heat input amount until the regenerator temperature reaches a plurality of set temperatures previously set in correspondence with the regenerator temperature is increased. Therefore, fuel consumption at the directly fired regenerator 3 is increased.

Further, when temperature of cooling water supplied from the cooling water passage to the absorber 9, that is, the inlet temperature to the absorber 9 of cooling water is comparatively low and the air conditioning load is comparatively low, according to the absorption chiller-heaters of the first and the second embodiments, depending on the way of determining the set temperatures in correspondence with the regenerator temperature, there is a case in which a reduction in the heat input amounts to the exhaust heat fired regenerator 1 and the directly fired regenerator 3 is not carried out even when the input amounts are excessive. When such a state is brought about, there is a case in which the concentration of the concentrated solution is concentrated more than necessary and crystallization of the absorbent solution or the like is brought about.

Therefore, according to the absorption chiller-heater of the embodiment, as shown by FIG. 1, the control portion 11 detects the inlet temperature of cooling water by using the cooling medium temperature sensor 53 for detecting the temperature of cooling water in an inlet portion of the cooling water passage 45. Further, as shown by FIG. 6, in proportion to the inlet temperature of cooling water detected by the cooling medium temperature sensor 53, the set temperature in correspondence with the regenerator temperature, that is, the set temperatures Tg1, Tg2, Tg3, Tg4 when the heat input amount is reduced in the first and the second embodiments and the set temperatures Tg1', Tg2', Tg3', Tg4' when the heat input amount is increased are changed.

In this way, by changing the set temperature in correspondence with the regenerator temperature as a linear function of the input temperature of cooling water, when the temperature of cooling water is lowered, the set temperature in correspondence with the regenerator temperature is also lowered. Therefore, the heat input amount until the regenerator temperature reaches the plurality of set temperatures previously set in correspondence with the regenerator temperature can be restrained from being increased, fuel consumption at the directly fired regenerator can be reduced and energy conservation performance can be promoted.

Further, there can be restrained a state in which a reduction in the heat input amounts to the exhaust heat fired regenerator 1 and the directly fired regenerator 3 is not carried out despite that the heat input amounts are excessive from being brought about by the inlet temperature of the cooling water. Therefore, crystallization of the absorbent solution by condensing the concentration of the concentrated solution more than necessary can be restrained by the inlet temperature of the cooling water and therefore, reliability of the absorption chiller-heater can further be promoted.

Further, although according to the embodiment, there is shown a case of changing the set temperature in correspondence with the regenerator temperature in proportion to the inlet temperature of the cooling water, as shown by FIG. 7, the set temperature in correspondence with the regenerator temperature can be elevated in steps by setting set temperatures Tco1, Tco2 (Tco1<Tco2) previously in correspondence with the inlet temperature of the cooling water and when the inlet temperature of the cooling water becomes equal to or higher than Tco1 and becomes equal to or higher than Tco2. Further, as shown by FIG. 8, the set temperature in correspondence with the regenerator temperature can also be changed in proportion to the inlet temperature of the cooling water detected by the cooling medium temperature sensor 53 between Tco1 and Tco2.

Further, although according to the first through the third embodiments, the regenerator temperature is constituted by a higher one of either temperature of the temperature of the exhaust gas fired regenerator 1 and the directly fired regenerator 3. However, since the temperatures of the exhaust heat fired regenerator and the directly fired regenerator become temperatures further proximate to each other by circulating the solution, it is also possible that temperature detector is provided to either one of the temperatures of the exhaust heat fired regenerator and the temperature of the directly fired regenerator and a control is carried out by constituting the regenerator temperature by the temperature of one of the regenerators provided with the temperature detector. In this case, the directly fired regenerator is disposed on the downstream side of the exhaust heat fired regenerator with respect to flow of the solution and therefore, even when heat is inputted only to the exhaust gas fired regenerator, the temperature of the directly fired regenerator indicates a temperature substantially the same as that of the exhaust heat fired regenerator. Therefore, when the temperature detector is provided to only one of the regenerators, by providing the temperature detector to the directly fired regenerator, the heat input amounts to the regenerators can further firmly be controlled. Further, when the control is carried out by constituting the regenerator temperature by temperature of a higher one of the temperature of the exhaust heat fired regenerator and the temperature of the directly fired regenerator as in the embodiment, the heat input amount to the regenerator can further firmly be controlled.

In addition thereto, even when the temperature detector are provided to both of the exhaust heat fired regenerator and the directly fired regenerator, the control can be carried out not only by constituting the regenerator temperature by a higher one of either one of the temperature of the exhaust heat fixed regenerator 1 and the temperature of the directly fired regenerator 3 but also constituting the regenerator temperature by either one of the temperatures of the exhaust heat fired regenerator and the directly fired regenerator by other method. For example, the control portion can carry out a control such that a state of driving the exhaust heat fired regenerator is determined from presence or absence of a drive signal indicating driving of an exhaust heat source and when the exhaust heat fired regenerator is driven, the regenerator temperature is constituted by the temperature of the exhaust heat fired regenerator and when the exhaust heat fired regenerator is not driven, the regenerator temperature is constituted by the temperature of the directly fired regenerator.

Further, although according to the first through the third embodiments, water is exemplified as the cooling medium for the indoor machine, various cooling media other than water can be used as the media for the indoor machine.

Further, the invention is not limited to the absorption chiller-heaters having the constitutions of the first through the third embodiments but is applicable to absorption chiller-heaters of multi heat source drive type having various constitutions each having an exhaust heat fired regenerator and a directly fired regenerator for making a fluid having exhaust heat other than exhaust heat by firing exhaust gas or a fluid recovering exhaust heat flow.

According to the invention, the reliability of the absorption chiller-heater can be promoted.

What is claimed is:

1. An absorption chiller-heater comprising:
a first regenerator heated by exhaust heat;
a heat fluid flow path in which a heat fluid heated by the exhaust heat flows, supplying the exhaust heat to said first regenerator;
a flow path control device provided on said heat fluid flow path for opening and closing the heat fluid flow path, thereby switching the heat fluid to flow or to be cut off to said first regenerator;
a second regenerator heated by combustion heat;
a burner having a variable combustion amount, supplying the combustion heat to said second regenerator;
a first temperature detector for detecting a temperature of said first regenerator or said second regenerator;
a cooling medium temperature detector for detecting a temperature of a cooling medium supplied to an absorber, wherein said controller changes values of the regenerator set temperatures in accordance with the temperature of the cooling medium detected by said cooling medium temperature detector;
a heat medium temperature detector for detecting a temperature of a heat medium output from an evaporator; and
a controller for controlling operation of said flow path control device and said burner;
wherein said controller sets the temperature detected by said first regenerator temperature detector to be a regenerator temperature, and
said controller controls at least one of operations to open and close said flow path control device and to increase and reduce the combustion amount of said burner in accordance with the temperature of the heat medium detected by said heat medium temperature detector and the regenerator temperature.

2. The absorption chiller-heater according to claim 1, wherein said first regenerator temperature detector detects a temperature of said first regenerator and a second regenerator temperature detector detects a temperature of said second regenerator,
said controller sets a higher one of either temperatures of said first and second regenerators to be the regenerator temperature, and
said controller controls at least one of operations to open and close said flow path control device and to increase and reduce the combustion amount of said burner in accordance with the temperature of the heat medium detected by said heat medium temperature detector and the regenerator temperature.

3. The absorption chiller-heater according to claim 1, wherein the combustion amount of said burner is variable in steps by a plurality of stages,
said controller determines to open or close said flow path control device and the combustion amount of said burner based on a plurality of heat medium set temperatures and the temperature of the heat medium and,
said controller subsequently increases and reduces in steps the combustion amount of said burner based on a plurality of regenerator set temperatures and the regenerator temperature, whereby a heat input amount to the second regenerator is increased and reduced.

4. The absorption chiller-heater according to claim 1, wherein the combustion amount of said burner is continuously variable, and
said controller determines to open and close said flow path control device and stop to combust or combust said burner based on a plurality of heat medium set temperatures and the temperature of the heat medium, wherein when said burner is combusted, said controller subsequently determines in steps a maximum combustion limit based on a plurality of regenerator set temperature and the regenerator temperature, the maximum combustion limit setting a range of the combustion amount in which the combustion amount is varied in a proportional manner with the temperature of the heat medium, whereby a heat input to said second regenerator is increased and reduced.

* * * * *